(No Model.)

T. S. TAYLOR.
DEVICE FOR COUPLING BICYCLES.

No. 556,168. Patented Mar. 10, 1896.

Witnesses.

Inventor.
Thomas S. Taylor.
By Smith & Osborn
Attorneys

UNITED STATES PATENT OFFICE.

THOMAS S. TAYLOR, OF SAN RAFAEL, CALIFORNIA.

DEVICE FOR COUPLING BICYCLES.

SPECIFICATION forming part of Letters Patent No. 556,168, dated March 10, 1896.

Application filed May 22, 1895. Serial No. 550,268. (No model.)

*To all whom it may concern:*

Be it known that I, THOMAS S. TAYLOR, a citizen of the United States, residing at San Rafael, in the county of Marin and State of California, have invented a new and useful Device for Coupling Bicycles Together, of which the following is a specification.

This invention relates to a means for coupling or rigidly connecting two bicycles together for practical use and joint operation whereby a skilled rider on one machine can afford assistance to a beginner or a timid person on the other machine, or two riders of limited experience can mutually support and encourage each other.

My invention consists essentially of an adjustable frame composed of transverse brace-bars and a longitudinal middle bar or reach, the ends of the brace having clamps or coupling means to secure them to the frame of the bicycles, and both the braces and the reach being extensible in length, to adjust the device to bicycles of different makers. In addition to these parts the device has an extensible bar or connecting-rod and clamping means for connecting the tillers of the two machines rigidly together, so that the steering-wheels shall move regularly together at all times. The following description explains at length the construction and combination of these parts and their operation, reference being had to the accompanying drawings, in which—

Figure 1:
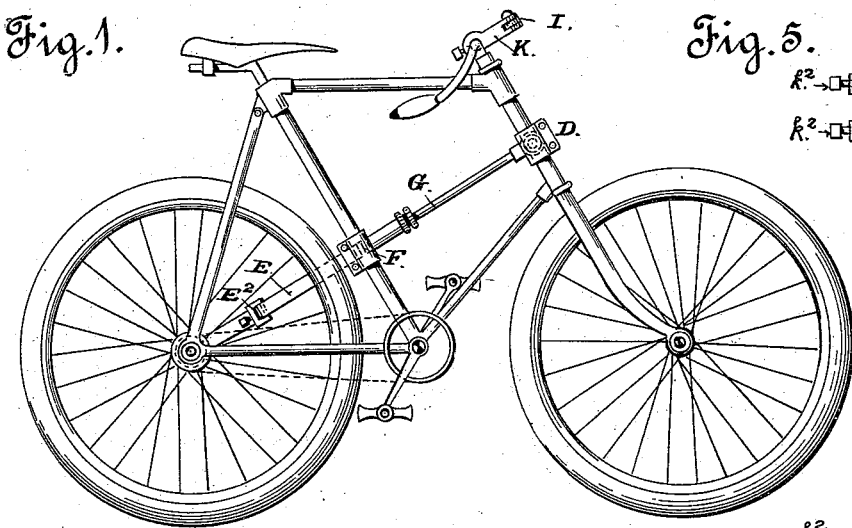
Figure 5:
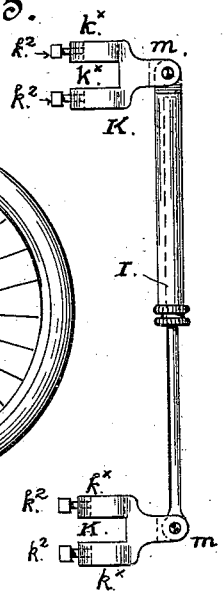
Figure 2:
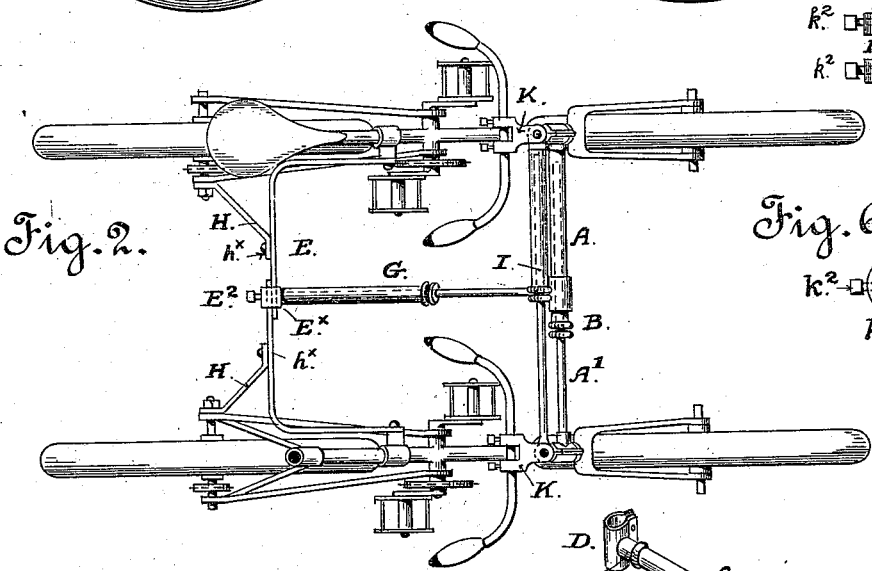
Figure 6:
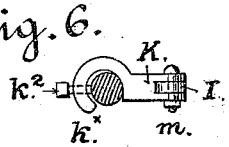
Figure 3:
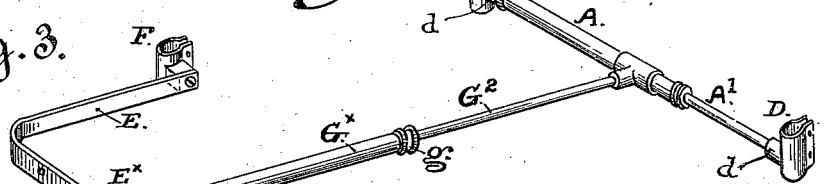
Figure 3:
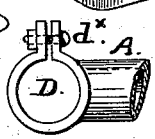
Figure 4:
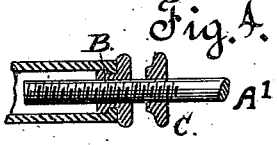

Figure 1 is a side elevation of the right-hand one of two bicycles coupled together according to my invention. Fig. 2 is a plan or top view showing the two bicycles and the connecting-frame or coupling means, the seat of the right-hand machine being broken off to show parts beneath. Fig. 3 is a perspective view of the extensible coupling-frame. Fig. 4 is a detail view of the coupling and a portion of the center of one of the braces. Fig. 5 is a plan of the connecting means by which the two tillers are rigidly connected together. Fig. 6 is a side view in detail of one of the clamps on this part.

The forward bar of the frame is composed mainly of a tube A and a threaded rod or tube A', of smaller diameter, movable in the tube A, but stiffly connected to it by a nut B swiveled in the end of the tube and provided with a jam-nut C, so that the bar formed of these two parts can be lengthened or shortened as required. On the outer ends of these are split clamps or clips D of proper size to fit around the standards or bars of the bicycle-frame and provided with screws $d^\times$, for drawing them tightly together when placed around the standards. These couplings D are attached or secured to the ends of the bar by swivel joints or connections $d$, so that the clamps can be turned and adjusted axially to suit the angles at which the standards of the different makes of bicycle-frames stand out of the perpendicular.

The rear brace E is formed of two flat overlapping bars secured together at the middle, where they overlap, by means of a box $E^\times$ and a set-screw $E^2$, and the outer ends of the bars are provided with clamps F for securing them rigidly to the standards of the bicycle-frame, these outer end portions of the bars being bent at right angles forwardly, as shown in Fig. 3, so that the center portion of the bar is thrown back sufficiently to clear the heels of the rider while working the pedals. The reach G is formed of the telescoping rods $G^\times$ $G^2$, one sliding within the other and united by the screw-joint $g$, in the same manner as the parts of the lateral bar are joined, so that the distance between the two bars A E can be regulated or adjusted as desired, according to the make or style of the machines being coupled.

The connection of the rear bar E with the bicycle-frame may be strengthened by the addition of short angle-braces H H, which are bolted to the bars E at $h^\times$ and connected to the bicycle-frame at the rear bearings for the wheels.

The steering-wheels of the two machines are coupled together by an extensible rod I and short arms K, fixed on the tillers of the wheels, the construction and arrangement of these parts being shown in Figs. 5 and 6. The arms K have hook-shaped clamps $k^\times$, shaped to embrace the bars of the steering-handles and provided with clamp-screws $k^2$ for securing them rigidly to the tillers. The extensible rod I is attached at the ends to the outer ends of the arms K by a pivot-joint $m$, and the rod is extensible in length. By this means the two tillers are rigidly coupled together, so that both wheels have simultaneous and uniform movement.

Having thus described my invention, what I claim, and desire to secure by Letters Patent, is—

1. The herein-described coupling device for connecting two bicycles together, consisting of a coupling-frame of transverse bars having clamps on their outer ends, by which they are secured to the bicycle-frame, and a longitudinal reach uniting the said transverse bars and composed of telescoping sections.

2. The combination, with two bicycles placed side by side for joint use and operation, of a coupling-frame composed of the transverse brace-bars secured at the ends to the bicycle-frames, the longitudinal reach-bar connecting the two brace-bars, and a rigid bar connecting the tiller of one bicycle with the tiller of the other for joint and simultaneous operation, all the transverse bars being composed of telescoping sections, as and for the purpose set forth.

3. A means for coupling two bicycles together side by side for joint operation, consisting of the extensible front brace-bar provided with clamps on its outer ends for securing it to the front standards of the bicycles; the extensible rear brace-bar having similar means for securing it to the rear part of the bicycle-frames, the extensible reach or longitudinal center bar connecting together the said two brace-bars; and the fixed arms on the tillers and the rod connecting said arms together, substantially as described.

In testimony that I claim the foregoing I have hereunto set my hand and seal.

THOMAS S. TAYLOR. [L. S.]

Witnesses:
C. W. M. SMITH,
CHAS. E. KELLY.